UNITED STATES PATENT OFFICE.

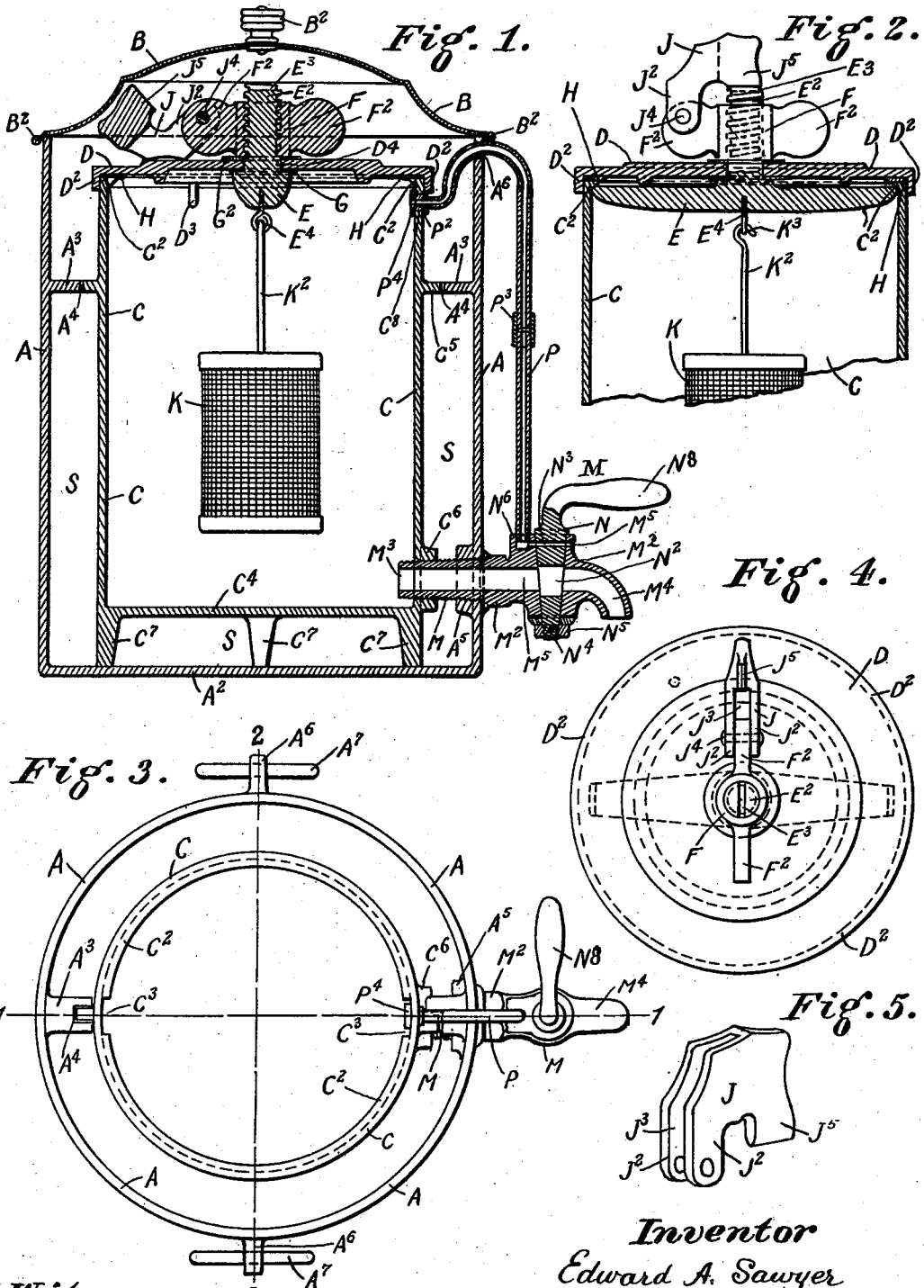

EDWARD A. SAWYER, OF CINCINNATI, OHIO.

APPARATUS FOR MAKING DECOCTIONS.

1,000,693.  Specification of Letters Patent.  Patented Aug. 15, 1911.

Application filed August 18, 1909. Serial No. 513,485.

*To all whom it may concern:*

Be it known that I, EDWARD A. SAWYER, a citizen of the United States, and a resident of the city of Cincinnati, in the county of Hamilton and State of Ohio, have invented certain new and useful Improvements in Apparatus for Making Decoctions, of which the following is a specification.

The several features of my invention and the various advantages resulting from their use conjointly or otherwise will be apparent from the following description and claims.

In the accompanying drawing, making a part of this specification, and in which similar characters of reference indicate corresponding parts,—Figure 1 is a view partly in section and partly in elevation, the section being a vertical central one taken through the plane of the dotted line 1, 1, of Fig. 3. Fig. 2 is a view partly in section and partly in elevation showing the yoke, said section being taken in the plane of the dotted line 2, 2, of Fig. 3. The lower portion of this figure is broken away for economy of space, the devices for rotating the yoke being shown in operative position. Fig. 3 is a top view of the inner and outer vessels, the lid of each vessel having been removed. Fig. 4 is a top view of the lid between the vessels and showing the device for turning the yoke thrown back out of operative position. Fig. 5 is a perspective view of the devices for rotating the yoke.

I will now proceed to describe my invention in detail.

A indicates an outer vessel preferably cylindrical in form. The bottom $A^2$ of this vessel is flat or otherwise properly adapted to set upon a heating device, so that the liquid of the vessel A may be raised to the boiling point. This vessel A is provided with a lid B. This lid B rests loosely upon the upper edge of the vessel A, and is provided at its upper edge with a downwardly extending flange $B^2$, whose function is to keep the lid B in position upon the vessel A. The lid B is preferably arched upward at the center, as shown, so as to provide space under it for the portions of mechanism hereinafter described; otherwise the inner vessel would have to be made shorter, and the room within it curtailed. The inner vessel C is preferably cylindrical, and the bottom $C^4$ is preferably flat. This vessel C is made quite a little smaller than the vessel A, so that there is the space S between each part of the vessel C and the vessel A. To this end, the vessel C is duly supported. It is preferably supported on suitable legs $C^7$. The vessel C is provided with a separable lid D, and this lid is provided with a peripheral flange $D^2$, which flange fits down closely around the vessel C when the lid D is placed upon the top of the vessel C. The vessel C at the inside of the upper edge is provided with a flange $C^2$, which flange is provided with two notches $C^3$, $C^3$, said notches being at opposite ends of a given diameter of the said vessel C. To prevent the upper portion of the vessel C falling out of vertical line, it has lugs $C^5$ respectively adapted to fit in the slots $A^4$ of the lugs $A^3$ of vessel A.

I provide a yoke piece E, whose ends are sufficiently narrow to respectively pass down through the adjacent notch $C^3$. When the yoke is thus passed down between the said notches and comes below the line of the level of the flange $C^2$, it is rotated, and the length of the yoke being substantially that of the width of the inner diameter of the vessel C, the ends of the yoke will respectively abut against their respective adjacent portions of the flange $C^2$, and the yoke cannot be lifted up while in this position. The yoke is provided centrally with a screw threaded bolt $E^2$, which extends vertically upward and passes through the hole $D^4$ in the center of the lid D. Between the yoke E and the under side of the lid is a washer G, and upon the screw threaded bolt $E^2$ is screwed a nut F. Between this nut F and the upper side of the lid D is interposed a washer $G^2$. The nut F is provided with means for rotating it, a convenient means being shown and consisting of the thumb pieces $F^2$, $F^2$, respectively located on opposite sides of the nut. Between the upper end of the vessel C and the lid B is interposed a washer H. When the nut F is rotated downwardly on the bolt $E^2$, it will draw the yoke E upward forcibly against the flange $C^2$ of the vessel C, and forcibly depress the lid B down against the washer H, and thus tightly press the washer H between the upper end of the vessel C and the lid D. Such an operation renders the vessel C air tight, so that no air from within can go out of the vessel, nor from without come into the vessel between the lid and the vessel itself.

For preventing the yoke from rotating too far when inserted in the vessel C, I provide a detent $D^3$, which is adapted to come into contact with the yoke and prevent its farther rotation. In this way, after the yoke has been introduced through the flange $C^2$ into the vessel C, it cannot be rotated so far around as to again come opposite the notches $C^3$ but will stop in a vertical plane substantially at right angles to a vertical plane passing through the tube opposite the notches $C^3$, $C^3$.

It is very desirable, in mechanism used for the objects for which the present invention is designed, that the means for operating it should be always present in it, and the operator need not be compelled to carry with him tools for manipulating any of its parts. For this reason, I provide a device of the nature of a screw driver which is as follows: J indicates the body of the device, which body is provided at one side with a slot $J^3$, separating two arms $J^2$, $J^2$. Between these arms $J^2$, $J^2$, is received in the slot $J^3$ one of the thumb pieces $F^2$, and these arms $J^2$, $J^2$ are pivoted at $J^4$ to the said thumb pieces $F^2$. The other end of this body piece J is provided with an extension $J^5$, which, when the device is lifted up and thrown over toward the center of the lid, is adapted to enter the channel or groove $E^3$ in the top of the screw bolt $E^2$, substantially as shown in Fig. 2. When the turning device J is in the slot $E^3$ of the bolt $E^2$, then by rotating the thumb pieces $F^2$, $F^2$, the yoke E can be rotated. So the yoke, if the lid is to be fastened down, can be rotated until it is in a line at right angles to the straight line joining the notches $C^3$, or in case the yoke is already in such position, and it is desired to remove the lid from the vessel C, such rotation of the nut $E^2$ by means of the thumb pieces $F^2$, $F^2$, will bring the yoke into position where its ends are respectively under the adjacent notches $C^3$. Then the yoke can be lifted up through the notches and with it the lid B and the same removed. In the operation of adjusting these parts, so that the lid shall be fastened upon the vessel C, the screw turning device J is put in operative position in the slot $C^3$; the yoke having been passed through the opening $C^3$, is then rotated as aforementioned, until it is in a position to properly bear up against the flange $C^2$. Then the screw turning device J is thrown backward, as shown in Figs. 1 and 4, and out of operation. By the thumb pieces $F^2$, $F^2$, the nut F is screwed down forcing the lid tightly upon the washer H, and the latter upon the vessel C, thus making the joint between the lid and the vessel air tight. To separate the lid B from the vessel C, the aforementioned steps are reversed.

When it is desired to prepare the decoction of coffee or the like, or any substance of a granulated nature which requires a cage or vessel having perforated sides in which the said coffee or the like must be held, this cage, one form of which is shown in the drawing, is located within the vessel C and preferably suspended from the latter, substantially as shown, namely: A cage K has a vertical rod $K^2$ provided at its upper end with a hook $K^3$. The yoke E is provided with an eye $E^4$, and the hook $K^3$ of the cage is made to engage the said eye $E^4$ substantially as shown.

I will now describe in general the mode in which my invention as a whole operates. The cock M being closed, the vessel C is filled to a suitable height with the liquid to be used (usually water). The substance from which the decoction is to be made is located in the vessel C. Coffee or the like will be placed in the bag or cage K. This vessel is now hermetically sealed by the application of the lid D in the manner aforementioned. The space S between the air tight vessel C and the vessel A is filled to a suitable height with liquid, usually water. The lid B is now placed on vessel A, and the entire apparatus is placed over the fire. Any suitable means of heating the vessel A can be employed. In due time, the liquid in space S will be raised to the boiling point and will thereupon boil and continue to do so as long as the vessel remains over the fire. In the meantime the liquid in the vessel C will be raised to the boiling point only, causing a condensation of steam, producing a continuous steeping, as in the case of coffee or tea. After the coffee or tea is made in this apparatus, this combination vessel can be taken from the fire and be used as a coffee urn or a tea urn.

One of the several points of advantage resulting from my invention lies in the fact that, no matter how much the liquid in space S may boil, the liquid in the vessel C will not boil and will not burst off the cover B. Another great point of advantage is that the vessel C being hermetically sealed, the decoction and other substances within the vessel C will be preserved pure and sweet and fresh for an indefinite period of time. In such air and steam tight (hermetically sealed) inner vessel, the latter is not in contact with dry heat, and it is impossible in the inner vessel to boil any decoction or the like; which in the case of coffee has many advantages. Among these advantages may be mentioned that it is impossible to extract the one ingredient most to be avoided in coffee, i. e. tannic acid. The escape of aroma as heretofore in the case of coffee or tea is prevented, by keeping the contents of the inner vessel to just below the boiling point (as in the case of coffee extracting all of the caffeine, the active principle and the only essentially important thing to be obtained) and preserving the aroma.

That feature of my invention which consists in the combination of the inner vessel sealed with an air tight lid, and located within an outer vessel, containing a liquid surrounding the sides of the inner vessel and being also between the bottom of the inner vessel and the bottom of the outer vessel, may be advantageously employed in cases where the decoction in the inner vessel after being made is withdrawn from the inner vessel through the top thereof, the lid having been removed. This mode of use can be advantageously employed in the case of the making of bouillon and other soups.

What I claim as new, and of my invention and desire to secure by Letters Patent, is:—

1. A vessel C provided with a lid, and means for making the junction of the lid and the said vessel air tight, said means consisting as follows: a flange at the upper inner edge of the vessel C and extending inwardly, openings in said flange, a yoke whose end portions are respectively adapted to pass through said openings in the flange and to be rotated under the said flange, the yoke connected centrally to a screw threaded bolt extending up through and beyond the said lid, a nut screwed onto the said bolt above the lid, the upper end of the screw threaded bolt provided with a transverse slot, adapted to receive the end of a screw driver for enabling the said bolt to be rotated and the yoke adjusted to place, a gasket or packing being present between the vessel C and the lid.

2. A vessel C provided with a lid, and means for making the junction of the lid and the said vessel air tight, said means consisting as follows: a flange at the upper inner edge of the vessel C and extending inwardly, openings in said flange, a yoke whose end portions are respectively adapted to pass through said openings in the flange and to be rotated under the said flange, the yoke connected centrally to a screw threaded bolt extending up through and beyond the said lid, a nut screwed onto the said bolt above the lid, the upper end of the screw threaded bolt provided with a transverse slot, an extension of the nut and a device for rotating the yoke and consisting of a piece pivoted at one end to the extension of the nut and at the other provided with a screw driver end adapted to enter the said slot in the end of the said bolt, and to rotate the same, as the nut is rotated.

3. A vessel C provided with a lid, and means for making the junction of the lid and the said vessel air tight, said means consisting as follows: a flange at the upper inner edge of the vessel C and extending inwardly, openings in said flange, a yoke whose end portions are respectively adapted to pass through said openings in the flange and to be rotated under the said flange, the yoke connected centrally to a screw threaded bolt, extending up through and beyond the said lid, a nut screwed onto the said bolt above the lid, the upper end of the screw threaded bolt provided with a transverse slot, the nut provided with two oppositely extending wings or extensions, and a screw driving device, one end having two separated parallel arms between which is received a wing of the nut, the other end of the screw driving device being provided with a screw driver adapted to enter said slot and to rotate the yoke through the agency of the said bolt, as the said nut is rotated.

EDWARD A. SAWYER.

Attest:
 ALBERT D. SHOEKLEY,
 K. SMITH.

Copies of this patent may be obtained for five cents each, by addressing the "Commissioner of Patents, Washington, D. C."